United States Patent
Chen et al.

(10) Patent No.: US 8,249,170 B2
(45) Date of Patent: Aug. 21, 2012

(54) METHOD AND APPARATUS FOR PACKET LOSS DETECTION AND VIRTUAL PACKET GENERATION AT SVC DECODERS

(75) Inventors: Ying Chen, Beijing (CN); Kai Xie, Beijing (CN); Purvin Bibhas Pandit, Somerset, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1035 days.

(21) Appl. No.: 12/224,239

(22) PCT Filed: Feb. 14, 2007

(86) PCT No.: PCT/EP2007/051451
§ 371 (c)(1),
(2), (4) Date: Aug. 21, 2008

(87) PCT Pub. No.: WO2007/096288
PCT Pub. Date: Aug. 30, 2007

(65) Prior Publication Data
US 2009/0016447 A1    Jan. 15, 2009

(30) Foreign Application Priority Data
Feb. 27, 2006   (EP) .................................. 06300164

(51) Int. Cl.
*H04N 7/64* (2006.01)
(52) U.S. Cl. .................................. 375/240.27
(58) Field of Classification Search .......... 375/130–153, 375/240.01–240.29; 704/500–504; *G10L 19/00, G10L 21/04; H04N 7/12, 11/02, 11/04; H04B 1/00, H04B 1/66*
See application file for complete search history.

(56) References Cited

U.S. PATENT DOCUMENTS

| 5,247,363 A | 9/1993 | Sun et al. |
| 2002/0152440 A1 | 10/2002 | Yona et al. |
| 2006/0117357 A1 * | 6/2006 | Surline ........................... 725/90 |
| 2006/0233242 A1 * | 10/2006 | Wang et al. ............... 375/240.08 |
| 2006/0282737 A1 * | 12/2006 | Shi et al. ....................... 714/746 |

(Continued)

OTHER PUBLICATIONS

J.F. Arnold et al: "Error resilience in the MPEG-2 video coding standard for cell based networks—A review—Image Communication" Signal Processing., vol. 14, No. 6-8, May 1999, pp. 607-633 XP004165399.

(Continued)

*Primary Examiner* — Gims Philippe
*Assistant Examiner* — Brent R Lindon
(74) *Attorney, Agent, or Firm* — Robert D. Shedd; Jeffrey M. Navon (57) ABSTRACT

Packetized video data with a base-layer and at least one enhancement-layer organized in a GOP structure may contain packet loss errors. A method for detecting such errors includes the steps of reading header information relating to a layer, generating a scheme or selecting a predefined scheme according to the header information. The scheme can be made up of a display order number, and/or a number of reference frames and temporal level for the frames of the respective layer. The method can then extract from received video data frames the display order number, and/or the number of reference frames and temporal level parameters, and detect that one or more frames or packets are missing. The received parameters are compared with the parameters of expected frames according to the scheme and a missing packet or frame is determined by a mismatch between received and expected parameters.

7 Claims, 2 Drawing Sheets

U.S. PATENT DOCUMENTS

2007/0183494 A1* 8/2007 Hannuksela ............... 375/240.1

OTHER PUBLICATIONS

E. Khan et al: "Iterative Error Detection and Correction of H.263 Coded Video for Wireless Networks", IEEE Transactions on Circuits and Systems for Video Technology,vol. 14, No. 12, Dec. 2004, pp. 1294-1307, XP001211155.

Chen Ying et al. "Frame Loss Error concealment for SVC" Joint Video Team (JVT) of ISO/IEC MPEG & ITU-T VCEG, Oct. 12, 2005, pp. 1-17, XP002422831.

J. Reichel et al: "Draft of Joint Scalable Video Model JSVM-4 Annex G", Joint Video Team (JVT) of ISO/IEC MPEG & ITU-T VCEG, Oct. 21, 2005, pp. 1-165, XP002422832.

Search Report Dated Apr. 26, 2007.

* cited by examiner

METHOD AND APPARATUS FOR PACKET LOSS DETECTION AND VIRTUAL PACKET GENERATION AT SVC DECODERS

This application claims the benefit, under 35 U.S.C. §365 of International Application PCT/EP2007/051451, filed Feb. 14, 2007, which was published in accordance with PCT Article 21(2) on Aug. 30, 2007 in English and which claims the benefit of European patent application No. 06300164.8, filed Feb. 27, 2006.

FIELD OF THE INVENTION

The invention relates to scalable video coding (SVC). In particular, the invention relates to a method and an apparatus for packet loss detection and virtual packet generation at decoders for SVC bit-streams.

BACKGROUND

Error concealment methods have been introduced for JSVM4[1]. Exemplarily, four methods are described in JVT-Q046[2]. This known solution for error concealment is targeting on fixed GOP (group-of-pictures) size, where the base-layer is H.264 compliant with spatial and FGS (Fine Grain Scalability) scalable layers. Temporal scalability in SVC is supported by a hierarchical B frame GOP structure. In this structure, bi-directionally predicted frames (B frames) within a GOP have different temporal levels according to a defined scheme. However, there is a need to further improve the robustness and correctness of error concealment. Moreover, supporting error concealment for any kind of scalability and combined scalability is desirable.

[1] "Scalable Video Coding—Joint Draft 4", J. Reichel, H. Schwarz, M. Wien, Joint Video Team (JVT) of ISO/IEC MPEG & ITU-T VCEG (ISO/IEC JTC1/SC29/WG11 and ITU-T SG16 Q.6), Draft Output Document from JVT JVT-Q202-JSVM4, 17th Meeting: Nice, France, October, 2005
[2] Chen Ying, Jill Boyce, Xie Kai "Frame Loss Error Concealment for SVC", JVT-Q046, JVT of ISO/IEC MPEG & ITU-T VCEG, Nice, October 2005

SUMMARY OF THE INVENTION

The invention provides a method for detecting errors in received packetized video data, wherein the video data contain a spatial or spatio-temporal base-layer (BL) and at least one enhancement-layer (EL), and each layer is organized in frames or slices with a respective header and a GOP structure, and different temporal levels exist within layers. A packet is assumed to contain a frame or a slice.

The method according to the invention comprises the steps of reading/extracting header information relating to a layer, generating from the header information a scheme, the scheme comprising at least display order number (that is picture order count, POC), number of reference frames (that is frame_num) and temporal level for the frames within a complete GOP of the respective layer, extracting from received video data frames parameters including POC number, frame_num and temporal level, and detecting that one or more frames or packets are missing, wherein the received parameters are compared with the parameters of expected frames according to said scheme and a missing packet or frame is determined by a mismatch between received and expected parameters.

Instead of generating a scheme from the header information, it is also possible to select among predefined schemes a predefined scheme according to the header information. Such predefined schemes may be stored, or generated on-the-fly using an appropriate algorithm.

In one embodiment of the invention, the method further comprises the steps of
generating for each missing packet or frame a default packet, wherein each default packet gets the display order number (POC), number of reference frames (frame_num) and temporal level of the respective expected packet, and inserting for each missing packet the generated default packet into the data stream before the data stream is parsed.

In one embodiment, the GOP structure contains a plurality of complete GOPs and not more than one incomplete GOP (that is a GOP with less pictures/frames than the others), and the method according to the invention further comprises the step of determining for a missing frame if it belongs to a complete GOP or to the incomplete GOP. In one embodiment said inserting of default packets is only performed for missing frames that belong to complete GOPs.

The step of determining for a missing frame if it belongs to a complete GOP or to the incomplete GOP in the previous embodiment can be further specified in comprising the steps of estimating the maximum GOP size for the incomplete GOP, and not generating or suppressing default packets for the incomplete GOP for display order numbers (POC) that are above the estimated GOP size.

In one embodiment, the method according to the invention can be further specified in that said header information contains an indication of the difference between the POC numbers of successive frames of a defined spatio-temporal or spatial layer.

The previous embodiment can be further specified in that said defined spatio-temporal or spatial layer is the BL.

In one embodiment, said indication is the logarithm to the basis two ($\log_2$) of said difference.

Moreover, the invention provides a signal containing packetized video data, wherein the video data are organized in frames or slices and have a respective header and a group-of-picture (GOP) structure containing a plurality of GOPs, and wherein each video frame or slice comprises at least an indication of its POC number, and wherein said header contains an indication (log 2_min_poc_increase) of the difference between the display order numbers (POC) of successive frames.

The video signal can be further specified in that it has a spatial or spatio-temporal base-layer and at least one enhancement-layer, and the indication of the difference between the display order numbers (POC) of successive frames refers to the frames of one defined layer of these layers.

Further, the invention provides an apparatus for generating such signal.

An apparatus for detecting errors in received packetized video data, wherein the video data contain a base-layer and at least one enhancement-layer and each layer is organized in frames or slices with a respective header and a group-of-picture (GOP) structure, comprises means for reading and extracting header information relating to a layer, means for generating from the extracted header information a scheme, or means for selecting a predefined scheme according to the extracted header information (SEI), the scheme comprising at least display order number (POC), number of reference frames (frame_num) and temporal level for the frames within a complete GOP of the respective layer, means for extracting from received video data frames parameters including POC number, frame_num and temporal level, and means for detecting that one or more frames or packets are missing, wherein the received parameters are compared with the parameters of expected frames according to said scheme and a missing packet or frame is determined by a mismatch between received and expected parameters.

In one embodiment of the invention, the apparatus further comprises means for generating for each missing packet or frame a default packet, wherein each default packet gets the display order number (POC), number of reference frames (frame_num) and temporal level of the respective expected packet, and means for inserting for each missing packet the generated default packet into the data stream before the data stream is parsed.

In one embodiment, where the GOP structure contains a plurality of complete GOPs and not more than one incomplete GOP, the apparatus according to the invention further comprises means for determining for a missing frame if it belongs to a complete GOP or to the incomplete GOP, and means for performing said inserting of default packets only for missing frames that belong to complete GOPs.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the packet structure of an SVC video bit-stream.

DETAILED DESCRIPTION OF THE INVENTION

Figure 1:
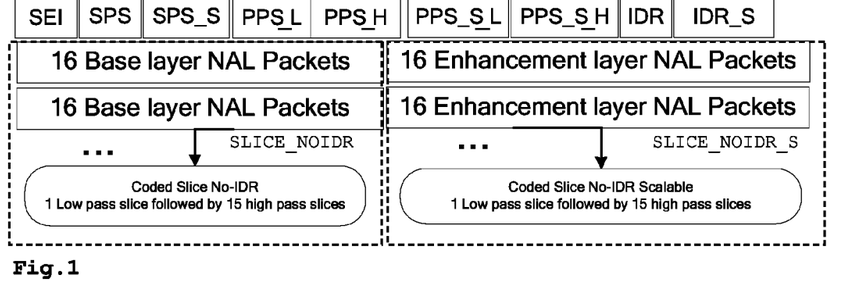

FIG. 1 shows the NAL (network abstraction layer) packet structure of an SVC bit-stream. The sequence of packets contains Supplementary Enhancement Information (SEI), sequence parameter set (SPS), sequence parameter sets in scalable extension (SPS_S), picture parameter sets (PPS), picture parameter sets in scalable extension (PPS_S), coded slice of an IDR picture (SLICE_IDR) and coded slice of an IDR picture in scalable extension (SLICE_IDR_S). Though generally a picture may be built of more than one slice, it is exemplarily assumed here that a picture contains one slice. Each NAL packet with picture data contains data of a slice, and thus of a picture. A packet with coded slice of an IDR picture (SLICE_IDR) contains an IDR picture (IDR), which serves as a key picture.

These packets are followed by several groups of pictures (GOPs) with each picture being (exemplarily) packed into a separate packet. Pictures are either normal non-IDR pictures (SLICE_NOIDR) or non-IDR pictures in scalable extension (SLICE_NOIDR_S). In the example of FIG. 1, the bit stream has two spatial layers and the GOP size is 16, so that one line (16 BL packets+16 EL packets) makes a complete GOP. The number of complete GOPs in a stream may be very large, e.g. several thousands. The last picture in each GOP is an I- or P-frame (intra-coded or predicted) serving as key picture, while the others are B-frames (bi-directionally predicted).

Figure 2:
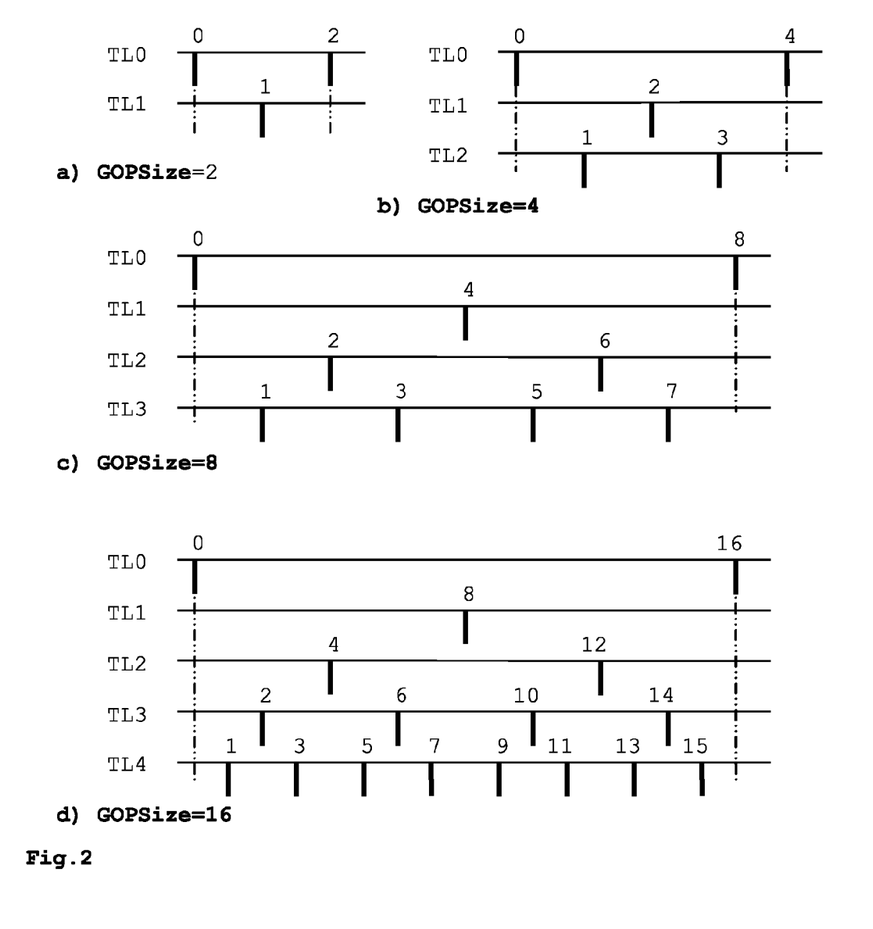
FIG. 2 temporal levels within GOPs of different size.

FIG. 2 shows temporal levels within hierarchical B frame GOPs of different size. The frames on the lowest temporal level TL0 are called key pictures and are either I or P frames, and one of them (denoted as 0) belongs actually to the previous GOP. Generally, frames on higher temporal levels than TL0 are bi-directionally predicted from two or more reference frames. Reference frames can be frames on lower temporal levels or (for frames that are not on the highest temporal level) previously decoded frames of the same temporal level. Temporal levels are decoded in increasing order, i.e. first TL0, then TL1, then TL2 etc.

In a GOP with GopSize=2 as shown in FIG. 2 a) only two temporal levels TL0,TL1 exist, with one frame 1 on the higher temporal level TL1 and the other frame 2 on the lowest temporal level TL0. Frame 1 is predicted from its reference frames 0 and 2, which are decoded first.

In a GOP with GopSize=4 (FIG. 2 b)) three temporal levels TL0,TL1,TL2 exist, with one frame 4 on the lowest temporal level TL0, one frame 2 on the first temporal level TL1 and two frames 1,3 on the highest level TL2. First the frame 2 is predicted from its reference frames 0 and 4, and then the frames 1 and 3 are predicted from their reference frames 0,2 and 4. The same reference frames are used for both, because it is the highest temporal level.

In a GOP with GopSize=8 (FIG. 2 c)) four temporal levels TL0, ..., TL3 exist. At first, frame 8 is predicted from frame 0, then frame 4 from frames 0 and 8, then frame 2 from frames 0,4,8, then frame 6 from frames 0,2,4,8, and then the frames 1,3,5,7 from the frames 0,2,4,6,8.

GOPs with higher GopSize are constructed correspondingly, e.g. GopSize=16 in FIG. 2 d).

The invention provides packet loss detection and virtual frame generation, in particular for packets with non-IDR pictures (denoted Slice_NOIDR/Slice_NOIDR_S in FIG. 1). The transmission of packets belonging to SEI Message, SPS, PPS and the first IDR picture is assumed to be guaranteed. According to the invention, a first phase of packet loss detection is followed by lost packet analysis, virtual packet generation and insertion, parsing and decoding.

The packet loss detection uses the picture_order_count (POC) values, frame_num values and temporal level values. POC is an enumeration of the frames in display order, as used in FIG. 2 a)-d). frame_num is a parameter of a frame that indicates the number of (potential) reference frames that it has. For packet loss detection, the POC increase between two successively displayed pictures is also important. We call it here POC_Increase. We usually assume for the highest spatial layer a POC_Increase of 1, i.e. all frames are displayed. However, sometimes this is not true. E.g. if the input frame rate is 30 fps and a spatial base-layer is encoded with only 15 fps, then the base-layer POC_Increase is 2, since only every second picture is encoded.

At the decoder, the POC_Increase is not known from the SEI message, which will cause problems for the packet loss detection. Initially the parser may detect that every second packet is lost. Although after some parsing it may be recognized that no packets with odd POC values were found and thus it might be concluded that the POC_Increase is 2, it may be too late: buffers may overflow and other problems may occur. This is not an optimal solution. In order to overcome this problem, one aspect of the present invention is to add an indication log 2_min_poc_increase of the minimum POC_Increase to the SEI message, as exemplarily shown in Tab.1 and described in the following.

TABLE 1

Insertion of log2_min_poc_increase into SEI packet

| scalability_info ( payloadSize ) { | C | Descripton |
|---|---|---|
| num_layers_minus1 | 5 | ue (v) |
| log2_min_poc_increase | 5 | ue (v) |
| for ( i = 0; i <= num_layers_minus1; i++ ) { | | |
| layer_id[ i ] | 5 | u (8) |
| ... | | |

TABLE 1-continued

Insertion of log2_min_poc_increase into SEI packet

| scalability_info ( payloadSize ) { | C | Descripton |
|---|---|---|
| ... |  |  |
| } |  |  |
| } |  |  |

If we define the maximum temporal_level of all the layers belonging to the same dependency level (spatial resolution layer) as MTL, the POC_Increase is $2^{log\,2\_min\_poc\_increase}$ for the spatial layer with the maximum MTL ($MTL_{max}$). For another spatial layer with a (lower) maximum temporal_level of $MTL_{Layer}$, the POC_Increase is POC_Increase=$2^{MTLmax-MTLLayer}2^{log\,2\_min\_poc\_increase}$ or POC_Increase=$2^{MTLmax-MTLlayer+log\,2\_min\_poc\_increase}$ (eq. 1)

With SEI messages that have the log 2_min_poc_increase value inserted, it is easier to handle packet loss detection, also in the examples described above. If a base-layer with a frame rate of only 15 fps (frames per second) is coded, the value of the log 2_min_poc_increase parameter is one, and if also a spatial enhancement-layer with frame rate 30 fps is coded, the log 2_min_poc_increase is zero. So the problem of determining the minimum POC_Increase is solved for packet loss detection in a bit-stream that contains only a base-layer.

After detecting a packet loss, a virtual packet can be generated for the parser and the decoder. This is done in the decoder and before the real parsing. Always when a packet is sent to the parser, no matter if it is a correctly received packet or a virtual packet, the number of decoded pictures (decoded_index) will be incremented. Therefore it is advantageous to insert the virtual packets before the parser, so that the numbering of subsequent packets is correct.

The temporal_level of each layer is defined in the SVC Scalability Information SEI message syntax (see JVT_Q201). We define the maximum temporal_level of all the layers belonging to the same dependency level (spatial resolution layer) as MTL, so the size for the normal GOP is GopSize=$2^{MTL}$. With the normal GOP size, we can construct the relative POCs in a GOP. The relative POCs in a GOP are constructed using the hierarchical B frame structure. The relative POC, relative frame_num and temporal level values are listed by decoding order in the following tables, cf. FIG. 2 a)-d). They can be easily generated for a specific GOP size.

Alternatively, the following schemes can be predefined, and a scheme corresponding to the received GOPSize is selected.

TABLE 2a

Important values for GopSize = 1

| Decoding order | 0 | 1 |
|---|---|---|
| POC | 0 | 1 |
| frame_num | 0 | 1 |
| temporal_level | 0 | 0 |

TABLE 2b

Important values for GopSize = 2

| GopSize | 2 | |
|---|---|---|
| Decoding order | 0 | 1 | 2 |
| POC | 0 | 2 | 1 |
| frame_num | 0 | 1 | 2 |
| temporal_level | 0 | 0 | 1 |

TABLE 2c

Important values for GopSize = 4

| GopSize | 4 | | | |
|---|---|---|---|---|
| Decoding order | 0 | 1 | 2 | 3 | 4 |
| POC | 0 | 4 | 2 | 1 | 3 |
| frame_num | 0 | 1 | 2 | 3 | 3 |
| temporal_level | 0 | 0 | 1 | 2 | 2 |

TABLE 2d

Important values for GopSize = 8

| GopSize | 8 | | | | | | | |
|---|---|---|---|---|---|---|---|---|
| Decoding order | 0 | 1 | 2 | 3 | 4 | 5 | 6 | 7 | 8 |
| POC | 0 | 8 | 4 | 2 | 6 | 1 | 3 | 5 | 7 |
| frame_num | 0 | 1 | 2 | 3 | 4 | 5 | 5 | 5 | 5 |
| temporal_level | 0 | 0 | 1 | 2 | 2 | 3 | 3 | 3 | 3 |

TABLE 2d

Important values for GopSize = 16

| GopSize | 16 | | | | | | | | | | | | | | | |
|---|---|---|---|---|---|---|---|---|---|---|---|---|---|---|---|---|
| Dec. order | 0 | 1 | 2 | 3 | 4 | 5 | 6 | 7 | 8 | 9 | 10 | 11 | 12 | 13 | 14 | 15 | 16 |
| POC | 0 | 16 | 8 | 4 | 12 | 2 | 6 | 10 | 14 | 1 | 3 | 5 | 7 | 9 | 11 | 13 | 15 |
| frame_num | 0 | 1 | 2 | 3 | 4 | 5 | 6 | 7 | 8 | 9 | 9 | 9 | 9 | 9 | 9 | 9 | 9 |
| temp_lvl | 0 | 0 | 1 | 2 | 2 | 3 | 3 | 3 | 3 | 4 | 4 | 4 | 4 | 4 | 4 | 4 | 4 |

TABLE 2e1

Important values for GopSize = 32

| GopSize | 32 | | | | | | | | | | | | | | | |
|---|---|---|---|---|---|---|---|---|---|---|---|---|---|---|---|---|
| Dec. order | 0 | 1 | 2 | 3 | 4 | 5 | 6 | 7 | 8 | 9 | 10 | 11 | 12 | 13 | 14 | 15 | 16 |
| POC | 0 | 32 | 16 | 8 | 24 | 4 | 12 | 20 | 28 | 2 | 6 | 10 | 14 | 18 | 22 | 26 | 30 |

TABLE 2e1-continued

Important values for GopSize = 32

| GopSize | | | | | | | | 32 | | | | | | | | |
|---|---|---|---|---|---|---|---|---|---|---|---|---|---|---|---|---|
| frame_num | 0 | 1 | 2 | 3 | 4 | 5 | 6 | 7 | 8 | 9 | 10 | 11 | 12 | 13 | 14 | 15 | 16 |
| temp_lvl | 0 | 0 | 1 | 2 | 2 | 3 | 3 | 3 | 3 | 4 | 4 | 4 | 4 | 4 | 4 | 4 | 4 |

TABLE 2e2

Important values for GopSize = 32

| GopSize | | | | | | | | 32 | | | | | | | | |
|---|---|---|---|---|---|---|---|---|---|---|---|---|---|---|---|---|
| Dec. order | 17 | 18 | 19 | 20 | 21 | 22 | 23 | 24 | 25 | 26 | 27 | 28 | 29 | 30 | 31 | 32 |
| POC | 1 | 3 | 5 | 7 | 9 | 11 | 13 | 15 | 17 | 19 | 21 | 23 | 25 | 27 | 29 | 31 |
| frame_num | 17 | 17 | 17 | 17 | 17 | 17 | 17 | 17 | 17 | 17 | 17 | 17 | 17 | 17 | 17 | 17 |
| temp_lvl | 5 | 5 | 5 | 5 | 5 | 5 | 5 | 5 | 5 | 5 | 5 | 5 | 5 | 5 | 5 | 5 |

For a more exact description, two things need to be assumed. First, the real frame_num actually might be modified by modulus operation with the maximum frame number in real applications.

Second, the first frame in the decoding order actually is not exactly with an order of 0. Instead, it is usually more accurate for this frame to have a decoding order value of −(GopSize−1), because it has been coded at the beginning of the previous GOP.

Frames or frame information can be ordered by various criteria, e.g. by POC, by decoding order, by frame_num etc. This feature is helpful for packet loss detection and virtual packet generation.

Based on the input frame rate at the encoder, the POC increase of two successive displayed frames might be 1 or 2, or even $2^n$ when the number of spatial scalable layers is more than two and each layer has a different frame rate.

When counting the frame number, the POC increase needs to be considered.

The frame_num should be increased by 1 (except for the frames at the highest temporal level). If the value $^{POC}/_{POC\_Increase}$ is odd, the frame will not cause frame_num to increase; we call it odd frame here. Usually, in a normal GOP, these odd frames will have the highest temporal level. If there are more spatial layers and the input frame rates for the different layers are not the same, the POC_Increase may be larger; generally it is $2^n$, where n is the difference between MTL of the current layer and the MTL of the highest temporal layer. Usually the highest (spatial/spatio-temporal) layer will have the maximum number of temporal levels.

For example, for a "two spatial layer" case with base-layer (BL) and enhancement-layer (EL), the BL can have half the frame rate of the EL. If the BL has e.g. 5 temporal layers, the MTL of the BL is 5. Exemplarily the MTL of the EL is 6. So for the EL the POC_Increase is 1 and for BL the POC_Increase is $2^{6-5}=2$. The GOP sizes for BL and EL are $2^5$ and $2^6$ respectively.

When in this application the POC values of a specific spatial layer are mentioned, the POC is actually $^{POC}/_{POC\_Increase}$. After packet loss detection and at the last step of packet virtualization, the POC value will then be mapped back by multiplication with POC_Increase.

In an error-free bit-stream, each spatial or FGS layer will be composed by GopSize·n+d packets. There are n complete GOPs and then maybe an incomplete GOP with a size d, where d is less than GopSize. "Incomplete" however refers only to the fact that it contains fewer frames than "complete" GOPs, while an "incomplete" GOP is syntactically correct and the properties (see below) for each frame are adapted to the actual GOP size. We refer to the complete GOPs as normal GOPs and the last, incomplete GOPs as abnormal GOP. There is not more than one abnormal GOP in a bit-stream.

For each frame, there are three important properties: POC number, frame_num and temporal_level, as also listed in the tables Tab.2 a)-e). To describe the packet loss detection and virtual packet generation more easily, we introduce as an abstractor of frame information a 3D element f=(Poc,frame_num,temporal_level), and a set of these frames is A={$f_i$|i=0 . . . GopSize−1}. In the set A, we have a series of frames $f_i$ with a number of GopSize: |A|=GopSize. We call A herein the detection frame information list.

A can be ordered by decoding order, by POC, by frame_num, or even first ordered by temporal_level and then within the same temporal_level by POC.

After decoding a packet, the elements in A are updated, usually with a POC increase of GopSize and a frame_num increase of GopSize/2.

With the set A and the previous decoded frame, a correct prediction of the current element f' can be performed as f'=$f_{(decoded\_index \% GopSize)+1}$ when A is ordered by decoding order. When we get the current packet and generate the current frame $f_c$ with the POC, frame_num and temporal_level values decoded from the slice header, a comparison of f' and $f_c$ can be done.

We define two virtual frame elements to be equal if their POC values and frame_num values are equal.

If f' is equal to $f_c$, i.e. the received packet is equal to the expected packet, no packet was lost and decoded_index is incremented by 1. Else one or more packets must have been lost.

In the next step is determined if the received frame appears later in the sequence of frames of the current GOP: If an f'' exists, so that f''=$f_c$, then it is a normal GOP and one or more packets have been lost. Otherwise we are in the abnormal GOP, and thus at the end of the bit-stream.

Exemplarily, a bit-stream contains GOPs of GopSize=16, as shown in FIG. 2 d). The prescribed decoding order, according to Tab.2 d) above, is: $A_{POC}$={0,16,8,4,12,2,6,10,14,1,3,5,7, 9,11,13,15}, cf. FIG. 3a. When a packet with an unexpected POC number is received, e.g. POC=14 after POC=2, it is checked if the received packet (POC=14) is one of the remaining expected packets after the last correctly received packet (POC=2). This is the case here. Additionally, (some) POC numbers of subsequent packets may be regarded. In this example, these are {1,3,5,7,9,11,13, 15}, which matches the subsequently expected packets of the GOP. Therefore it can be concluded that we are in a normal GOP, and only two packets are missing, namely 6 and 10. As shown in FIG. 3b, these packets are then replaced by virtual packets i1,i2.

In another example, depicted in FIG. 4b, a GOP being an abnormal GOP contains only 9 frames. Then first the frame with POC=8 is coded (with the lowest temporal level in this GOP), then the frame with GOP=4 (second temporal level in this GOP; note that this GOP has no frame with POC=12), then the frames {2,6} (third temporal level) and then {1,3,5, 7,9}. So the correctly received order is {8,4,2,6,1,3,5,7,9}.

Now the detection of this abnormal GOP is described. The relative frame_num values of the packets of the described abnormal GOP are {1,2,3,4,5,5,5,5,5}. If e.g. a packet with POC=8 or POC=4 is missing, but then a packet with POC=2 is received, then the relative frame_num of this packet is 3. This does not match the relative frame_num of a normal GOP (which should be 5 for POC=3). This discrepancy between expected and received frame_num value in connection with the POC value can be used to detect the abnormal GOP. The same applies for the temporal_level property of the frames, and other parameters (e.g. nal_ref_idc).

Figure 3:
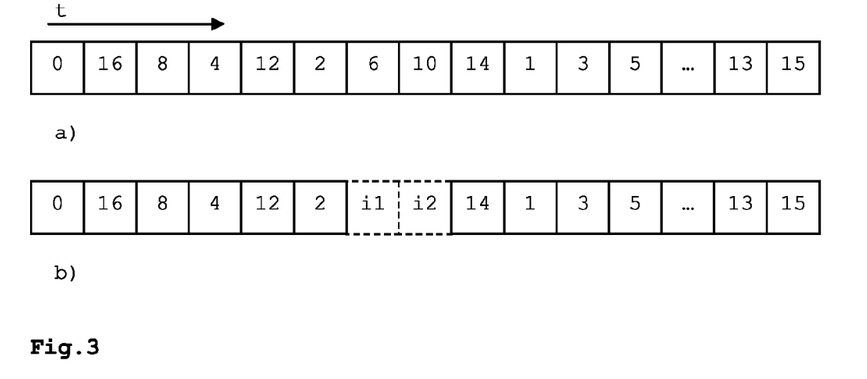
FIG. 3 a GOP with inserted virtual packets.

In the following, construction of virtual packets (packet virtualization) for a normal GOP is exemplarily described (cf. FIG. 3).

If we also ordered A by the decoding order and let the end of A connect the start of A, we can construct a ring. We insert the packets which correspond to the gap between f' and $f_c$ and the decoded_index is increased at the same time. E.g. if we have $f_a$ and $f_b$ (in FIG. 3 $f_a$=6, $f_b$=10) in the ring from f'' to $f_c$ (in FIG. 3 f''=2, $f_c$=14), we insert two virtual packets i1,i2 into the bit-stream for decoding, and the decoded_index is increased by 2. These packets i1,i2 now at least have the three correct values from $f_a$ and $f_b$: POC number, frame_num and temporal_level. $f_a$ and $f_b$ with some slice level preliminary values will be sent to the decoder, which employs error concealment techniques for reducing user disturbance.

Now construction of virtual packet for the abnormal GOP is described.

If we cannot find an f'' in A that is equal to the current frame $f_c$ (e.g. POC=3, frame_num=3 in the above example), we are in the decoding process of the abnormal GOP, which is just the very last part of a long bit-stream and shorter than a normal GOP. However it is the most complicated part to handle.

Once a packet loss in an abnormal GOP is detected, the following "abnormal GOP process" may be entered.

Figure 4:
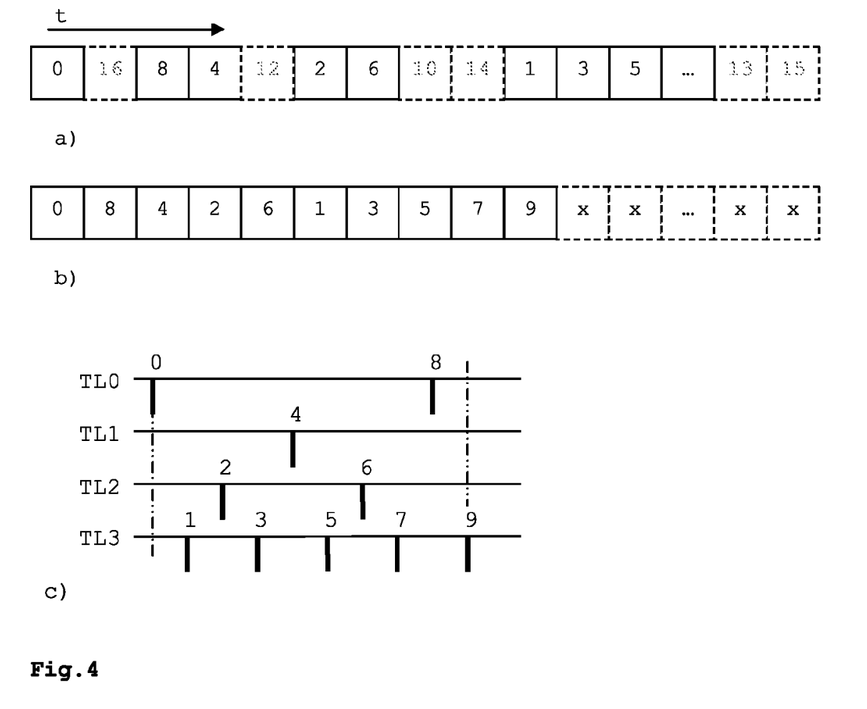
FIG. 4 an abnormal GOP.

First, all the lost packets of the normal GOP are inserted, as described above for normal GOPs. This is shown in FIG. 4, where exemplarily a GOP ends after POC=9, while the normal size of GOPs in the slice was GopSize=16. This has the purpose to determine an initial, expected relative order of frames: independent from the size of the incomplete GOP, the relative order of the frames that it contains is fixed. It is the same as for complete GOPs. E.g. (cf. FIG. 4) if an incomplete GOP has frames with POC={8} and POC={4}, then {8} will always be in a lower temporal level then {4}, and decoder earlier.

Before changing the GopSize parameter, the decoded_index is updated by next_decoded_index=cur_decoded_index % GopSize (where % is the module operation) or in short writing: decoded_index %=GopSize Then the GopSize is changed for the abnormal GOP, because it is different. Since the whole decoding process is near the end of the bit-stream, the GopSize value will be changed soon anyway.

The difference here versus normal GOPs is that A is updated in a different way, and the GopSize for the last abnormal GOP is estimated and changed. At the same time, frame_num values in A will also be changed.

In a first step, an upper bound for GopSize is determined. If current frame $f_c$ is an odd frame, we can know the upper bound of the GopSize with a possible error of 1 (<< and >> are shift operators):

$$GopSize_{abn,max}=((frame\_num-1) \% (GopSize>>1) <<1)+1 \quad (eq. 2)$$

Thus, one possibility for estimating an upper bound is to select an odd current frame and use this equation (eq. 2).

Else, if $f_c$ is not an odd frame, find an f''' in A, so that f''' has the same POC number as $f_c$. The GopSize will only decrease to some positive possible upper bound during the whole process, so f''' will always exist.

The iterative algorithm to follow is to start from the difference in frame_num between f''' and $f_c$ with both the same POC number, and decrease the value for each frame in A that has higher POC number but lower temporal_level than the current frame $f_c$ until the value is zero. The POC number of the last frame gives an upper bound for the GOP size:

---

Initialization[3]: frame_diff = f'''$_{frame\_num}$ − $f_{c\,frame\_num}$
temp_frame_diff = frame_diff;
for(i = GopSize-1; i >= 0;i--) //A is ordered by POC
{
    if ($f_{iPOC}$ > $f_{cPOC}$ && $f_{iTemporal\_Level}$ < $f_{cTemporal\_Level}$)
    temp_frame_diff --;
    if (temp_frame_diff ==0)break;
}

---

[3] Notation: $f_{c\,frame\_}$ means: frame_num of frame $f_c$ $GopSize_{abn,max}=f_{i-1POC}$ (i.e. the POC value of the frame i−1) $Gopsize_{abn,max}$ is the upper bound of GOP size of the abnormal GOP of the current spatial layer.

In a second step, the upper bound of GOP size of the abnormal GOP of all the spatial layers is updated. Note that $MTL_{layer}$<MTL.

$$GopSize_{layer}=GopSize \cdot 2^{MTL_{layer}-MTL}+\lfloor 2^{MTL_{layer}-MTL}-1 \rfloor$$

Now, we have for each layer a frame information list of A with a new length of GopSize. Other elements in A will be deleted.

Just for simplicity, we do not use subscripts to denote A for distinguishing the spatial layers, because each layer follows a similar process. However, each spatial layer may have its own list of elements A.

In the third step, the frame_num values in A are updated. We know the start start_frame_num from the frame_num of the last packet of the previous GOP. In the updated A, we give a new order for A: it is first ordered by temporal level, and within the same temporal level it is ordered by POC.

Actually this order is like the decoding order of a normal GOP. For simplicity, we will still call it decoding order. However, we use an ordering index t. So we have a newly ordered A={$f_t$|t=0, ... GopSize-1}

$$f_{0\,frame\_num} = start\_frame\_num$$

$$f_{t\,frame\_num} = \begin{cases} f_{t-1\,frame\_num} + 1 & \text{if } f_{t-1\,Temporal\_level} < MTL \\ f_{t-1\,frame\_num} & \text{else} \end{cases}$$

The frame_num values are also updated in a traditional way:

frame_num=frame_num % Max_Frame_Num

The process described in this step should be used for each spatial layer.

After this step, we prepare to handle the next packet and jump to the first step.

Once we are inside the abnormal packet loss detection, this process will continue until the parsing is finished; the last process step is iterated until all the packets are received. The GopSize of the truncated A may be stored for the next process of packet loss detection and packet virtualization. By using the decoded_index, we can always find an element in A if it is ordered by decoding order: $f_{decoded\_index+1}$. If the $f_c$ is equal to $f_{decoded\_index+1}$, no packet is lost and the current received packet is sent to the parser. Else a virtual packet is constructed using $f_{decoded\_index+1}$. In both cases decoded_index is increased by 1.

Further, a new reference lists construction method is helpful for BLSkip mode, as described in the following.

First, virtual syntax creation is described. The correct values for the virtual packets can be generated since the pic_order_cnt_lsb and frame_num is known from the slice header. If the temporal level is not zero, the virtual packet is specified as B frame with nal_ref_idc of 1 or 0 (if it is the highest temporal level, it will be 0), else it is specified as P frame with a nal_ref_idc of 3. We set the SPS ID and PPS ID of the virtual packets from a correctly received packet of the same layer.

Based on the temporal level being equal to 0 or not, we can also specify whether the virtual packet is a key picture or not.

If the virtual packet is the key picture, memory management control operation (MMCO) commands are inserted, as the known JSVM encoder does. These MMCO commands are used to remove the B frames (or rather non-key pictures) of the previous GOP and the key picture before the previous key picture (if it exists) out of the short term list. These commands are inserted at the slice header of the key pictures.

Also RPLR and reference index numbers need to be handled. Conventionally only the key picture needs to add RPLR commands, forcing the key picture to refer to the previous key picture.

To guarantee the efficiency of the error concealment method also for BlSkip mode, we also specify the EL parameters num_ref_idx__l0_active_minus1/num_ref_idx__l1_active_minus1 values and reference lists.

The BL packet values of num_ref_idx__l0_active_minus1 and num_ref_idx__l1_active_minus1 are set for the spatial EL packet.

Actually, not only the reference index numbers, but also the reference list of the EL should correctly match the BL reference list. Here "match" means that if we have the same ref_idx_lx values of list_X in the BL and EL, the corresponding reference pictures of the BL and EL will have the same display time (or POC). The conventional JSVM encoder guarantees this by using RPLR for BL, and the initialisation of reference lists construction to match the BL at the EL. So it is not necessary to generate RPLR commands for lost non-key pictures, but we still need to generate RPLR for key pictures.

If the restriction at the decoder defined in G.8.2.4.2.1 "Initialisation process for the reference picture list for P, EP and SP slices in frames" of JVT-Q201, SVC WD 4.0, is removed, then the RPLR for the lost enhancement layer is necessary to support the performance of BLSkip mode. The process described e.g. in the European Patent Application EP06300020 may be helpful for the error concealment as a default reference picture lists construction process if the spatial EL packet is lost.

The invention provides the following advantages.

Any packet loss can be handled, except for the packets belonging to SEI Message, SPS, PPS and IDR.

Long sequences (over 8000 frames) with a fixed GOP size can be handled. The length is GopSize·n+d (with $0 \leq d \leq GopSize$) Different spatial layers can have the same or different frame rates.

Each resolution can have one or more FGS layers. An FGS layer will be intentionally dropped if its corresponding lower quality level packet (with the same dependence level and temporal level) is lost or has been intentionally dropped.

Insertion of default packets before the parser has the advantage that the parser needs not handle packet loss situations, which e.g. may require packet renumbering, so that conventional simple parsers can be used. The payload content of such packets is not relevant.

An implementation for end_of_stream_rbsp will support iterative decoding.

The disclosed concept of the invention can also be used in cases where packets contain more than one frame or slice.

Both, multiple loop decoding and single loop decoding are supported. Packet loss detection for slice group feature can also be supported.

The invention can be used for video decoding products or for video encoding products, particularly if a base-layer and at least one enhancement-layer are included and have a plurality of temporal levels defined. Particularly, the spatial layers may have different frame rates.

The invention claimed is:

1. Method for detecting errors in received packetized video data, wherein the video data contain a base-layer and at least one enhancement-layer and each layer is organized in frames or slices with a respective header and a group-of-picture (GOP) structure, wherein the GOP structure contains a plurality of complete GOPs and an incomplete GOP, wherein the incomplete GOP has less pictures or frames than a complete GOP, the method comprising the steps of
   reading header information relating to a layer;
   generating from the header information a scheme, or selecting a predefined scheme according to said header information, the scheme comprising at least display order number, number of reference frames and temporal level for the frames within a GOP of the respective layer;
   extracting from received video data frames parameters, the parameters including display order number, number of reference frames and temporal level;
   detecting that one or more frames or packets are missing, wherein the received parameters are compared with the parameters of expected frames according to said scheme and a missing packet or frame is determined by a mismatch between received and expected parameters;
   determining for a missing frame if it belongs to a complete GOP or to the incomplete GOP; and
   in the case of an incomplete GOP, estimating a maximum GOP size of the incomplete GOP, and generating default packets for missing frames of the incomplete GOP with display order numbers unto the estimated GOP size, and not generating default packets for missing frames with display order numbers above the estimated GOP size.

2. Method according to claim 1, further comprising the steps of generating for each missing packet or frame a default packet, wherein each default packet gets the display order number, number of reference frames and temporal level of a respective expected packet; and inserting for each missing packet the generated default packet into a data stream before the data stream is parsed.

3. Method according to claim 2, wherein said inserting of default packets is also performed for all missing frames that belong to complete GOPs.

4. Method according to claim 1, wherein the step of estimating the maximum GOP size of an incomplete GOP comprises selecting a received frame with odd display order number, the frame having a frame_num parameter value of $f_{c,frame\_num}$;

calculating an upper bound for the GOP size according to $GopSize_{abn,max} = ((f_{c,frame\_num} - 1) \% (GopSize \gg 1) \ll 1) + 1$ wherein the calculated upper bound is used as estimated maximum GOP size and wherein $GopSize_{abn,max}$ is the upper bound of GOP size being determined and GopSize is the size of the GOP.

5. Method according to claim 1, wherein said header information contains an indication (log 2_min_poc_increase) of the difference between picture order count (POC) numbers of successive frames of a defined spatial layer.

6. Method according to claim 5, wherein said defined spatial layer is the spatial base-layer.

7. Method according to claim 5, wherein the indication is the $\log_2$ of said difference.

* * * * *